Oct. 7, 1952     S. F. MULFORD     2,612,779
COMPENSATED THERMOCOUPLE
Filed March 22, 1950
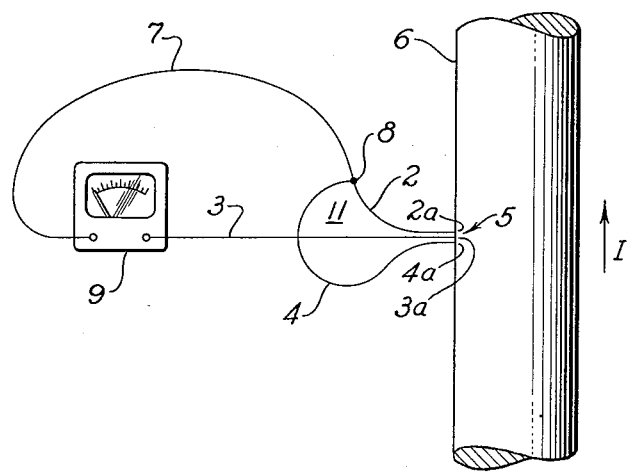
INVENTOR.
STEWART F. MULFORD
BY
ATTORNEY.

Patented Oct. 7, 1952

2,612,779

UNITED STATES PATENT OFFICE 2,612,779

COMPENSATED THERMOCOUPLE

Stewart F. Mulford, Van Nuys, Calif., assignor to the United States of America as represented by the United States Atomic Energy Commission Application March 22, 1950, Serial No. 151,123

6 Claims. (Cl. 73—359)

The present invention relates to the measurement of temperatures and is particularly concerned with the precise determination of the temperature of solid objects.

It is well known that a measurable electromotive force may be produced at the cold juncture of a pair of wires of dissimilar metals joined at a hot juncture and that this E. M. F. is proportional to the temperature difference between the hot and cold junctures. Apparatus employing this principle are commonly called thermocouples and have been widely used for the precise determination of temperatures.

In the measurement of the temperature of a point on a solid object it is necessary to join the hot juncture of the thermocouple wires to this point and under circumstances where temperature gradients exist over the surface of the object it is necessary for the thermocouple wires to meet at an exact point on the surface of the object in order to prevent the two wires from actually being at different temperatures at the so-called hot juncture. This difficulty appears to have been resolved by the use of capacitance welding by which quite accurate joining of elements is possible. However, in the circumstance where a direct current is flowing on the surface of the object whose temperature is to be measured, it is necessary to join the thermocouple wires with even greater exactness and methods employed to date have failed to provide the requisite accuracy. It will be appreciated that a current flow between the actual points of contact of the thermocouple wires with the surface may well introduce a potential difference which is sufficient to mask the thermal potential. For example, in order to measure 500 degrees Fahrenheit to within 1 degree by means of a conventional chromel-alumel thermocouple with 100 amperes flowing upon a surface having .003 ohm per inch resistance, it would be necessary for the points of contact of the two wires on the surface to be within .0001 inch apart. The practical difficulty, if not impossibility, of meeting such a requirement is believed obvious.

It is therefore an object of the present invention to provide a method and means of accurately determining the temperature of a surface having a potential gradient thereon.

It is a further object of the present invention to provide a novel thermocouple capable of precisely indicating the temperature of a surface having a potential gradient thereon.

It is another object of the present invention to provide a compensated thermocouple wherein extraneous potential differences between the thermocouple wires at the hot juncture is canceled.

A still further object of the invention is to provide an improved thermocouple capable of accurately indicating the temperature of a current carrying conductor.

Other objects and advantages of the present invention will become apparent from the following description and claims taken together with the sole figure of the drawing which comprises a schematic illustration of one embodiment of an improved thermocouple connected to a current-carrying conductor, the actual point of connection being considerably enlarged in the interest of clarity.

Considering the invention in detail, it will be noted on the drawing that three thermocouple wires 2, 3, and 4 are joined as by welding at a hot juncture 5 on the surface of the current-carrying conductor 6. At such juncture, wire 3 is disposed intermediate wires 2 and 4 in the direction of the flow of current I. Juncture 5 has been greatly enlarged in the drawing to illustrate the fact that the wires need not meet at a minute or precise point as is explained in more detail below; however, in practice the separation of the points of contact of the individual wires is minimized and may be of the order of a few thousandths of an inch, in order that no temperature difference shall exist between these points of contact.

The thermocouple wires above referred to, may be made of any suitable material from which a thermal potential may be derived, such as a chromel-alumel combination. The two outer wires 2 and 4 are of the same material, such as for example chromel, and the central wire 3 is formed of alumel, for example. Thermocouple wires 2 and 4 are joined together at a juncture point 8 at some distance from hot juncture 5, and a wire 7 of the same material as wires 2 and 4 is connected from juncture 8 to one terminal of a potential indicating meter 9; the outer end of wire 3 being connected to the other terminal of meter 9. From the foregoing, it is apparent that heating of the hot juncture of the thermocouple will produce thermal potential between wires 7 and 3 in accordance with well known principles of thermoelectricity.

As noted above, a very slight displacement of the points of contact of two thermocouple wires to a surface having a potential gradient thereon impresses a potential upon the thermocouple, which potential may well be of the same order of magnitude as the thermal potential and thereby introduce an appreciable error in the temperature indicated by the thermocouple. The present invention provides a unique solution to this difficulty through the provision of three wires contacting the surface at the hot juncture, as previously noted, and arranged and operated in a manner now to be described.

As to the operation of the invention it will be noted that a current I flowing as indicated on the surface of the conductor 6 produces at hot juncture 5 a potential between wires 2 and 3 of an opposite polarity to the potential produced between wires 4 and 3; however, the value of these potentials would not ordinarily be the same owing to the impossibility of equalizing the displacement of wires 2 and 4 from wire 3 with sufficient accuracy. By properly positioning point 8, which is the juncture of wires 2 and 4, it is possible to cancel out the potential developed between the wires at the surface of the conductor. In effect, a balanced resistance bridge 11 is formed of the resistance between point 2a and 3a along the conductor 6 and between points 3a and 4a, also along the surface of the conductor 6, together with resistance of wire 2 and wire 4. With a proper ratio of these four resistances it is possible to reduce the potential difference between wires 3 and 7 resulting from current flow on the surface of the conductor 6 to substantially zero. As the potential drop between points 2a and 3a is opposite in sign to the potential drop between points 4a and 3a, such potentials may be canceled out by balancing the resistance bridge 11; however, the thermal potential developed between wires 2 and 3 and wires 4 and 3 as a result of the temperature of the surface of the conductor 6 are of the same sign and thus the resistance bridge has no effect on these potentials and the meter 9 indicates the thermal potential to the exclusion of the potential produced by the current flowing on the surface of the conductor 6.

The bridge is balanced and the location of point 8 determined as follows. It is desirable first to produce a condition wherein no thermal potential is developed by the thermocouple while a current is flowing on the surface of the conductor in order that only one effect need be considered in balancing the bridge. This condition may be approximated by energizing the conductor 6 with a single voltage pulse whereby a current flows for only a very short period of time to produce a minimum heating effect. Upon the impression of such voltage pulse to the conductor 6 the meter 9 will indicate a potential which results from an unbalance of the bridge 11; this unbalance may be reduced by varying the relative resistance of wires 2 and 4 by changing the location of point 8 and thereby increasing or decreasing the length of one wire with respect to the other wire. This procedure may be repeated until the location of the juncture 8 of wires 2, 4, and 7 is obtained with sufficient accuracy that no reading is indicated by the meter 9.

Still greater accuracy in locating point 8 results from a further step now to be described. As noted above some slight heating of the surface of the conductor 6 is produced by the current pulse and thus the resistance bridge 11 has been only approximately balanced because of the error introduced by the thermal potential produced by the thermocouple. In other words, when the juncture 8 is approximately located, the bridge 11 is sufficiently balanced that the thermal potential transient becomes of appreciable magnitude with respect to the potential transient resulting from the instantaneous current flow on the surface of conductor 6. In order to further balance the resistance bridge 11 resort may be had to a comparison of steady state meter readings for the conditions of alternately opposite polarity current flow in the conductor 6. It will be appreciated that the thermal potential developed by the thermocouple will have the same polarity regardless of the direction of the current flow in the conductor 6; however, the potential impressed on the meter 9 as a result of the current flow in the conductor 6 reverses polarity when the direction of current flow is reversed. Thus for current flow in one direction along conductor 6 the thermal potential and impressed potential is additive and for current flow in the opposite direction along conductor 6 such potentials are subtractive. The conductor 6 may thus be energized to cause current flow in one direction and the meter reading noted, and the conductor 6 then energized to cause current flow in the opposite direction and the meter reading noted. A comparison of these meter readings provides an indication of the direction and distance which the point 8 should be moved to balance the bridge 11, and repetition of this procedure until the same meter reading is obtained for both directions of current flow locates the proper position of juncture 8 with great exactness.

When the resistance bridge 11 has been balanced as set forth above, the thermocouple has been compensated for effects of current flow on the surface of the object whose temperature is to be measured. The thermocouple is then calibrated in a conventional manner to correlate the potential readings of the meter 9 with the temperature of the hot juncture 5. By employing well-known techniques to prevent extraneous errors, it is possible with the compensated thermocouple of this invention to indicate the temperature of a surface having a current of the order of 1000 amperes flowing thereon with an accuracy of less than one degree at 700 degrees Fahrenheit. This accuracy corresponds to a displacement of the order of .00001 inch between the points of contact of the two wires of a conventional thermocouple to the surface of the object whose temperature is to be measured. It is thus apparent that the novel thermocouple disclosed herein is capable of precisely indicating temperatures under conditions normally considered impossible with conventional thermocouples.

With regard to the construction of the apparatus, it is to be noted that the juncture 8 may be formed by attaching wire 4 to a wire 7 comprising illustrated wires 1 and 2 and extending from the meter 9 to the hot juncture 5. Thus wires 2 and 7 may, for convenience, comprise but a single wire 7 which thereby facilitates the movement of juncture 8 as wire 4 need then only be slid along wire 7 until the proper ratio of resistance in the bridge 11 is obtained as determined by the above noted procedure. It is also believed apparent that like results may be obtained by combining wires 2 and 4 into a single wire and establishing point 8 by sliding wire 7 along wire 2—4 until the proper position is located as set forth above.

The present invention has been disclosed in only a single embodiment; however, it will be appreciated by those skilled in the art that numerous modifications are possible within the spirit and scope of the invention, and thus the invention is not to be limited except as defined in the following claims.

What is claimed is:

1. A compensated thermocouple for measuring the temperature of a current carrying conductor including a meter and first and second dissimilar thermocouple wires connected to said meter and to each other at the hot juncture on the surface of said conductor, a third thermocouple wire of the same material as said first thermocouple wire connected to said hot juncture on the opposite side of said second wire from said first wire in the direction of current flow on said conductor and to said first wire at a predetermined point to form a balanced resistance bridge whereby a potential impressed between said thermocouple wires at said hot juncture is canceled.

2. A thermocouple comprising first and second thermocouple wires of dissimilar material joined together at a hot juncture on the surface of an object whose temperature is to be measured and which has an electric current flowing thereon, a potential meter connected between said wires at a distance from said hot juncture, and a third thermocouple wire of the same material as said first wire and connected to said hot juncture on the opposite side of said second wire from said first wire in the direction of current flow on said object, said third wire being electrically connected to said first wire at a point away from said hot juncture, and said point of contact being determined by the relative resistance of said first and third wires between said point and said hot juncture whereby cancellation of a potential impressed between the wires at said hot juncture is effected.

3. A thermocouple comprising three thermocouple wires joined together at a hot juncture on the surface of a current carrying conductor whose temperature is to be measured, the centrally located wire with respect to the direction of current flow on said conductor at said hot juncture being of one material and the two outer wires of said juncture being of another material whereby a thermal potential is produced between said wires by the temperature of said conductor, said outer wires being joined at a point displaced from the hot juncture as determined by the relative resistances of said wires thereby canceling out a potential impressed between the wires at the hot juncture, another thermocouple wire of the same material as the two outer thermocouple wires joined to the point of connection thereof, and a meter connected between said centrally located thermocouple wire and said other thermocouple wire extending from the juncture of said outer thermocouple wires thereby indicating only the thermal potential developed by the thermocouple wires.

4. In a thermocouple having first and second thermocouple wires joined at a hot juncture on the surface of a current carrying conductor whose temperature is to be measured, the improvement comprising a third thermocouple wire of the same material as said first thermocouple wire and joined to said hot juncture on the opposite side of said second wire from said first wire along the direction of an electric current flow on said conductor, said third wire being joined to said first wire at a distance from said hot juncture as determined by the relative resistances of said first and third wires between the point of connection and the hot juncture thereby balancing out a potential impressed between said thermocouple wires by an electric current flowing on said current carrying conductor.

5. In a thermocouple including a meter and first and second thermocouple wires joined together at a hot juncture on the surface of a current carrying conductor whose temperature is to be measured and connected across said meter, the improvement comprising a third thermocouple wire of the same material as the first of said thermocouple wires and joined to said hot juncture on the opposite side of said second wire from said first wire in the direction of current flow on said conductor, said third wire being joined to said first wire at a point displaced from said hot juncture thereby defining a balanced resistance bridge with the resistances between wires at the hot juncture whereby the impression of a potential between the thermocouple wires at the hot juncture by current flowing on said conductor does not influence the meter.

6. In a thermocouple for measuring the temperature of a current carrying conductor and comprising two thermocouple wires connected to a potential meter, the improvement comprising a pair of wires of the same material as one of said thermocouple wires connected on opposite sides of said other thermocouple wire in the direction of current flow on said conductor at a hot juncture in contact with said conductor, said pair of wires being connected together at a point and joined to the thermocouple wire of the same material to define in combination with the resistance between wires at said hot juncture a balanced resistance bridge.

STEWART F. MULFORD.

REFERENCES CITED

The following references are of record in the file of this patent:

UNITED STATES PATENTS

| Number | Name | Date |
| --- | --- | --- |
| 2,438,575 | Ray | Mar. 30, 1948 |

FOREIGN PATENTS

| Number | Country | Date |
| --- | --- | --- |
| 175,354 | Germany | Sept. 21, 1906 |
| 235,746 | Great Britain | June 25, 1925 |
| 692,436 | Germany | June 19, 1940 |